INVENTORS
EDWARD F. HINDERER
JOHN C. HARTZELL
BY  CHARLES F. DALLIER

Curtis, Morris + Safford
ATTORNEYS

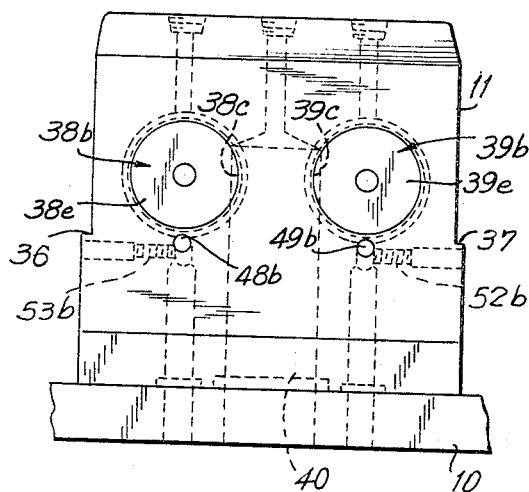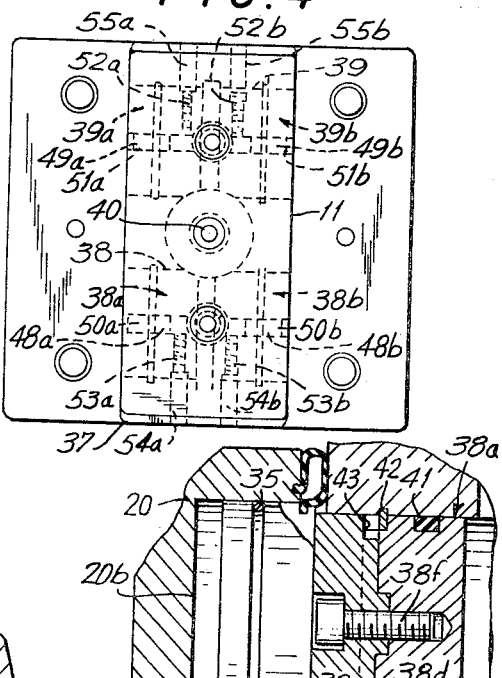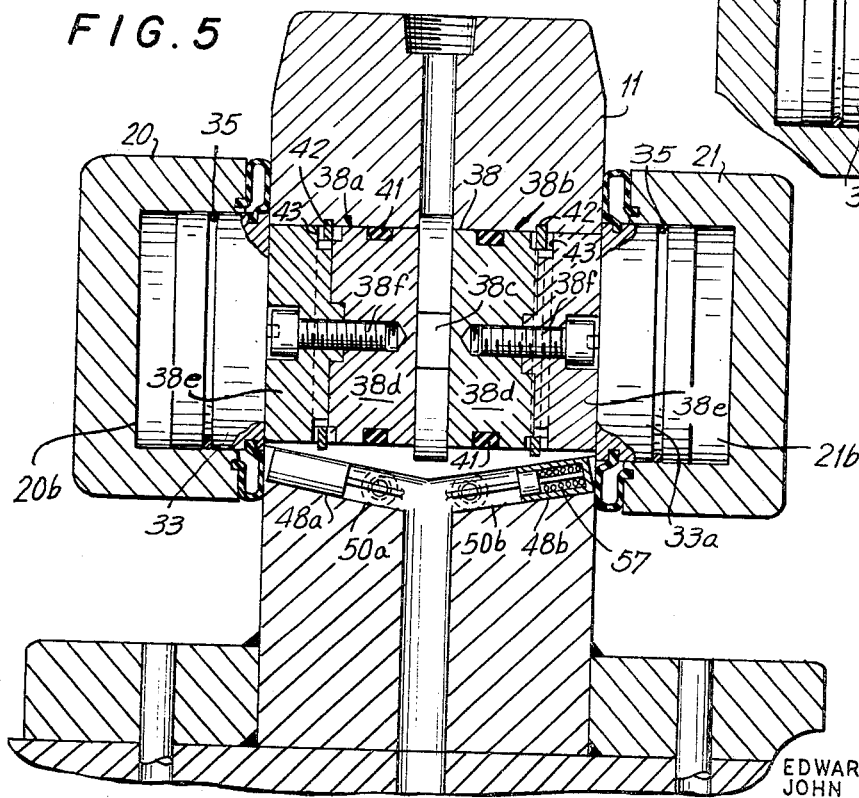

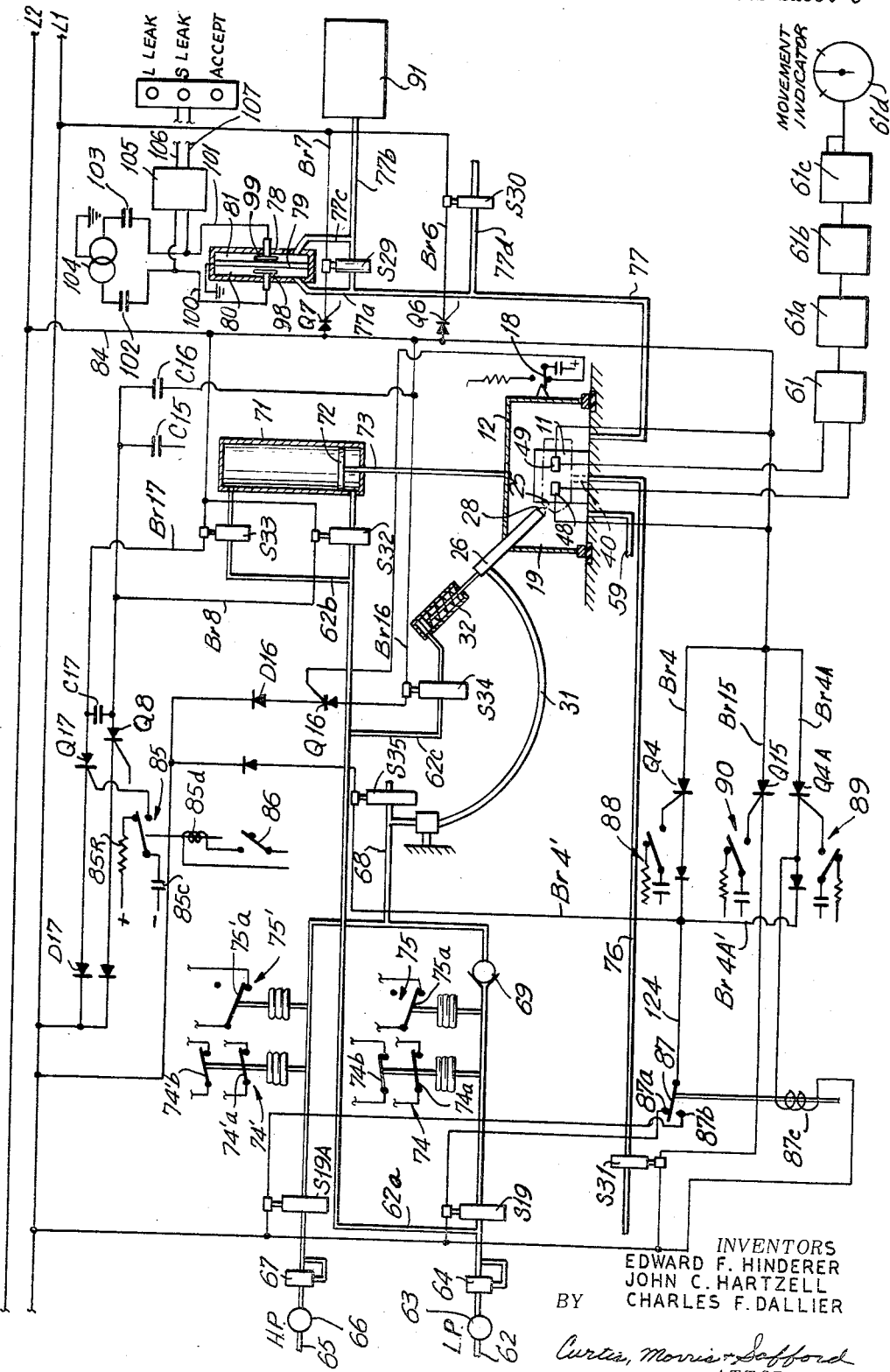

Jan. 20, 1970  E. F. HINDERER ET AL  3,490,269
LEAK TESTER FOR BRAKE HOUSINGS

Filed June 28, 1968  5 Sheets-Sheet 5

INVENTORS
EDWARD F. HINDERER
JOHN C. HARTZELL
BY  CHARLES F. DALLIER

Curtis, Morris + Safford
ATTORNEYS

United States Patent Office 3,490,269
Patented Jan. 20, 1970

3,490,269
LEAK TESTER FOR BRAKE HOUSINGS
Edward F. Hinderer, Royal Oak, John C. Hartzell, Jr., Trenton, and Charles F. Dallier, Farmington, Mich., assignors to Ajem Laboratories, Inc., Livonia, Mich.
Filed June 28, 1968, Ser. No. 741,112
Int. Cl. G01m 3/04
U.S. Cl. 73—49.2                                    15 Claims

ABSTRACT OF THE DISCLOSURE

A leak tester for chambered brake housings or other devices which include a pressure responsive elements. The device includes a fixture upon which the part to be tested is mountable and a movable shroud for enclosing the part. Various connections are provided for supplying low and pressure to the interior of the part. Electronic circuits automatically control the sequence of the testing operation and sense the presence of leaks and the movement of the movable element of the part.

---

The present invention relates to testing and more particularly to an improved apparatus for testing an assembly for leaks and also for proper operation of movable parts.

Leak testing apparatus has heretofore been provided which supplies a testing fluid under pressure to a chamber on one side of a wall being tested and to a standard chamber. After the pressure in the two chambers has become stabilized the two chambers are segregated and any difference in pressure occurring during a predetermined period is measured. If any difference in pressure exists a responsive mechanism is operated to indicate a leak, but if no difference in pressure develops during said period, another responsive mechanism is operated to indicate that the part is acceptable.

The measuring instrument usually comprises a diaphragm having its opposite sides subjected to the pressure in the separate chambers. When no leak exists the pressure on opposite sides of the diaphragm is equal. However, the diaphragm may be subjected to a considerable difference in pressure if a large leak exists, and the diaphragm, therefore, must be made sufficiently strong to withstand the greatest difference in pressure that is expected to occur without producing permanent deformation. Many times it is desirable to test a part at relatively high pressure to simulate actual operating condition, but this cannot be done to the degree of accuracy desired because the sensitivity of such diaphragms varies with the thickness of its wall.

Furthermore, it is many times desirable to test the movement of movable parts of an assembly as well as to test the parts of the assembly for leaks. For example, in addition to determining whether a chambered brake housing leaks, it would be desirable to determine whether it is leaking around the movable pistons in said housing as well as determining whether the pistons move properly in said housing.

One of the objects of the present invention is to provide a testing apparatus which is very sensitive to small changes in pressure without danger of damaging the sensing element of the measuring instrument while testing with a high pressure medium.

Another object is to provide a testing apparatus of the type indicated which will indicate movement of the parts in an assembly as well as changes in pressure resulting from a leak.

Another object is to provide testing apparatus of the type indicated which is adapted to test for leaks at both high and low pressure.

Still another object is to provide a leak testing apparatus which is of relatively simple and compact construction and reliable in operation.

These and other objects will become more apparent from the following description and drawings in which like reference characters denote like parts indicating the several views.

IN THE DRAWINGS

FIGURE 3 is a side elevational view of the fixture mounting the part and showing the pistons therein for actuating movable elements in the part being tested and recesses for mounting sensing elements adjacent the movable parts;

FIGURE 4 is a plan view of the fixture illustrated in FIGURE 3 and showing the passages therein for supplying motive fluid to the opposed pairs of pistons mounted therein;

FIGURE 5 is an enlarged sectional view taken on line 5—5 of FIGURE 1 to show the relationship of the pistons in the fixture with the pistons in the part being tested and the relationship of the electronic sensing element which responds to movement of the pistons in the part;

FIGURE 6 is a partial view of the pistons illustrated in FIGURE 5 to show the movement to an actuated position;

FIGURE 7 is a diagrammatic view showing the system for testing the part for movement of elements as well as for leaks;

Figure 1:
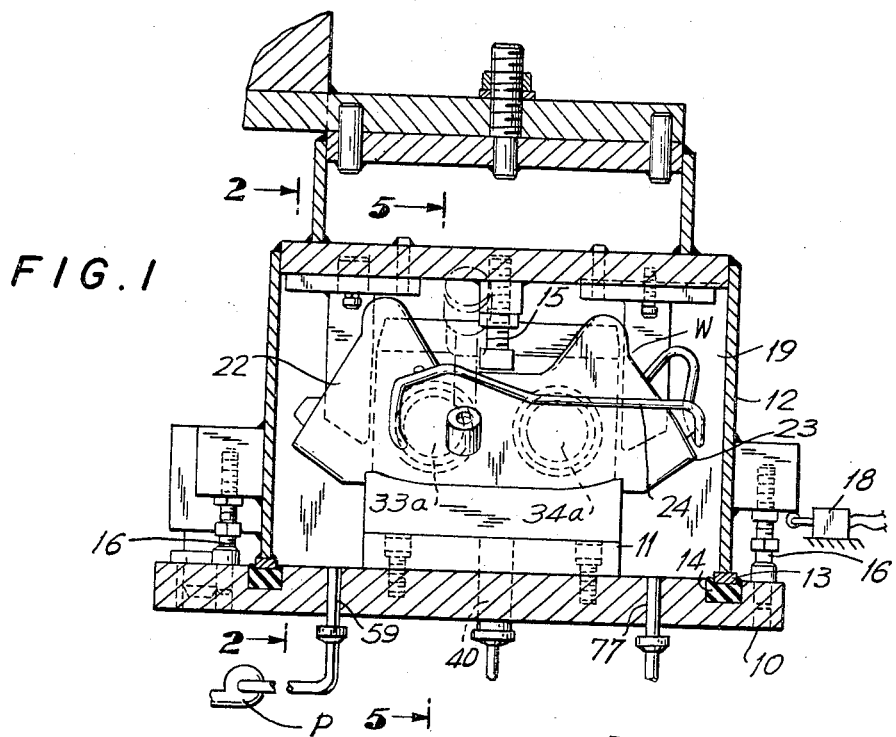
FIGURE 1 is a sectional view through the apparatus for mounting a part for testing and showing the fixture for mounting the part and shroud for enclosing the part and fixture.
Figure 2:
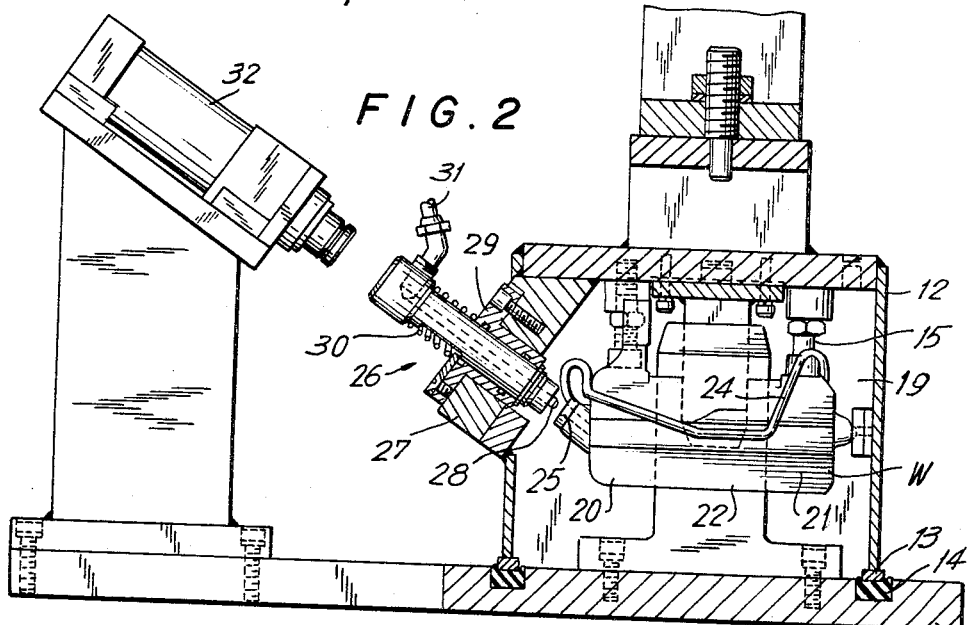
FIGURE 2 is a sectional view taken on line 2—2 of FIGURE 1 and showing the movable coupling on the shroud for supplying testing media under pressure to the interior of the part being tested.

Referring now to the drawings, the apparatus shown in FIGURES 1 and 2 comprises a support 10 in the form of a flat table top having a fixture 11 thereon for mounting a workpiece W. A movable shroud 12 is lowered relative to the support 10 to enclose the workpiece W and fixture 11 on which it is mounted. In a preferred arrangement, the support 10 may comprise a shelf of a cabinet containing the other elements of the testing system together with the responsive elements so that a person may test the part while facing the cabinet.

The shroud 12 is in the form of an inverted cup-shaped housing overlying the fixture 11 and having a lower peripheral edge 13 for engaging a pad 14 of resilient sealing material in the support 10 to seal the joint between. Shroud 12 has adjustable clamping elements 15 for engaging the workpiece W to hold it seated on the fixture 11 and adjustable stopping members 16 for engaging the support 10 to limit its downward movement. The shroud 12 also has an abutment for engaging a control switch 18 and the switch is so adjusted as to be actuated at the end of its downward movement relative to the support 10. Shroud 12 when in its lowered position forms a closed chamber 19 at the exterior of the workpiece W.

The part to be tested may take other forms, but for purposes of illustration, the part is shown as the housing for a disc type brake having spaced hollow sections 20 and 21 (see FIGURE 5) connected at their ends by sections 22 and 23 as shown in FIGURES 1 and 2. The hollow sections 20 and 21 are connected by a conduit 24 and one of the sections, for example, 20 has a nipple fitting 25. A coupling 26 is slidably mounted in wall 27 of the shroud 12 and has a nipple 28 at its ends for engaging the nipple fitting 25 on the part W. Coupling 26 is in the form of a tube which slides in a bushing 29 in the shroud wall 27 and is normally held in retracted position by a spring 30. A flexible hose 31 connects the end of the coupling tube 26 at the exterior of the shroud housing 12 to a source of testing fluid under pressure to supply such fluid to the hollow sections 20 and 21 of the part W. Coupling 26 is moved relative to the shroud 12 to engage the nipple 28 to the nipple fitting 25 by means of a fluid operated ram 32 when a test is to be made.

The hollow sections 20 and 21 of the part W each have spaced cylindrical bores in which opposed pistons 33 and 33a are shown in one bore in FIGURE 5 and one piston, 34a, of a corresponding pair 34, 34a being shown in FIGURE 1. Each piston has a sealing ring 35, preferably a quad-ring, providing a fluid tight closure between the pistons and brake housing W being tested.

As shown in FIGURES 3 to 6 the fixture 11 is in the form of a generally rectangular block straddled by the workpiece W and having shoulders 36 and 37 for supporting the workpiece. The fixture 11 has spaced cylindrical holes 38 and 39 extending through the block in axial alinement with but of smaller diameter than pistons 33, 33a and 34, 34a, respectively, and in which opposed pistons 38a, 38b and 39a and 39b are mounted. As shown most clearly in FIGURE 5 the pistons 38a and 38b are arranged in opposed relationship in the bore 38 with the outer faces of the pistons flush with the sides of the fixture. A central bore 40 in the fixture 11 has its sides overlapping the holes 38 and 39 to provide fluid inlet openings 38c and 39c into the space between the rearward sides of the opposed pistons, and each piston is provided with a sealing ring 41. A snap ring 42 seats in a recess 43 in the wall of the bore and engages the sides of a grooved recess in each piston 38a, 38b, 39a or 39b to limit its movement in the fixture 11. As shown, each piston 38a, 38b, 39a and 39b comprises a main body portion 38d or 39d and a cap 38e or 39e connected to each other by a screw 38f, and the body portion and cap of each piston have peripheral recesses at adjacent edges to form the recess 43 in the periphery of the piston into which a snap ring 42 projects. In assembling the parts the main body portion 38d or 39d of each piston is first inserted in cylindrical hole 38 or 39, a snap ring 42 is inserted into recess 43, the cap 38e inserted and the cap and piston body attached by a screw 38f. Thus, a motive fluid under pressure supplied through the central bore 40 and inlet openings 38c and 39c actuates the pistons 38a, 38b or 39a, 39b away from each other.

Any movement of the pistons 33 and 33a is sensed by electronic sensing elements 48a and 48b in bore holes 50a and 50b located adjacent the respective pistons. A similar pair of sensing elements 49a and 49b are provided in bore holes 51a and 51b under the pistons 39a and 39b of the adjacent pair. Sensing elements 48a, 48b and 49a, 49b are connected in an electronic circuit, later described in detail, for indicating movement of the pistons either outwardly or inwardly. As shown in detail in FIGURE 5, each sensing element 48a, 48b and 49a, 49b comprises a spool having a winding of a large number of turns of a wire 57 with lead wires extending from the ends of the windings of each sensing element. As will be observed in FIGURE 5, the sensing elements 48a and 48b are closely adjacent the pistons 33 and 33a so that the pistons influence the field produced by the sensing element and will indicate a movement of the pistons of as little as a few thousandths of an inch. The sensing elements 48a, 48b, 49a and 49b are each held in position in the fixture 11 by set screws 53a, 53b in bores 54a, 54b and set screws 52a, 52b in bores 55a, 55b. The lead wires from the sensing elements 48a, 48b, 49a and 49b are led to the exterior of the fixture 11 and shroud 12 by any suitable sealing means.

Outlet conduits 59 and 77 are provided in support 10 for the fixture 11 and connect the space 19 between the exterior of the part W and shroud 12 to the exterior of the shroud. As shown in FIGURE 1 the conduit 59 may be connected to an air pump P for evacuating the chamber 19 and conduit 77 is connected to a measuring instrument 78, later to be described. The sensing elements 48a, 48b, 49a and 49b are connected to an electronic circuit, see FIGURE 7, having an oscillator 61 and amplifier 61a, balance network 61b, differential amplifier 61c and meter 61d. It will be understood that relays controlled by electric valve means from the differential amplifier 61c can be substituted for the meter 61d to actuate indicating elements.

FIGURE 7 illustrates the remainder of the apparatus for testing a part W for movement of elements as well as for leaks. The apparatus comprises a line 62 from a low pressure source of fluid, such as air, having a filter 63 and pressure regulator 64 and control valve S–19 and a source of high pressure medium, such as air, having a line 65, filter 66, pressure regulator 67 and control valve S–19A. The lines 62 and 65 are joined together and to a line 68 connected to the coupling 26 through the flexible hose 31. Low pressure line 62 has a one way valve 69 therein which permits flow of the low pressure medium toward the part being tested, but prevents flow in the opposite direction. Line 68 has a dump valve S–35 for dumping testing fluid from the interior of the part W after completion of a test and before the coupling 26 is removed and the shroud raised. A branch 62a from the low pressure line 62 is connected to one end of a fluid operated ram 71 for raising the shroud 12 as controlled by a solenoid operated valve S–32; and a branch 62b is connected to the opposite end of the ram 71 for lowering the shroud as controlled by a solenoid operated valve S–33. Ram 71 has a piston 72 attached to the shroud 12 by a connecting rod 73. A branch 62c from branch 62a is connected to the fluid ram 32 for actuating the slidable coupling 26 as controlled by a solenoid actuated control valve S–34. Valves S–32, S–33 and S–34 are three way valves which will connect the cylinder space of the ram being controlled to an exhaust when closed and close the exhaust when open to supply motive fluid to the cylinder space. Low pressure line 62 has a pressure operated double pole double throw switch 74 with movable contact 74a and 74b and a pressure operated single pole single throw switch 75 with movable contact 75a for controlling a testing operation in a manner as will later appear. High pressure line 65 has corresponding switches 74′ and 75′ with movable contact 74′a and 74′b and 75′a.

Another line 76 is provided for supplying a fluid, such as a liquid, through the central bore 40 in the fixture 11, see FIGURES 3 and 4, to the space between the pairs of pistons 38a, 38b and 39a, 39b and the branch line has a control valve S–31.

In accordance with the present invention a part W may be tested for leaks by delivering a low or high pressure testing fluid to chambers 20b and 21b at the interior of the workpiece W or chamber 19 between the shroud 12 and the exterior of the workpiece, and then measuring any difference in pressure after a predetermined period of time in one of the chambers at the interior or exterior of the part. In the illustrated embodiment, a fluid testing medium under pressure is supplied to the chambers 20b and 21b at the interior of the part being tested and any change in pressure in the chamber 19 formed by the shroud at the exterior of the wall is tested to permit the use of a relatively thin and sensitive diaphragm without danger of damaging the diaphragm. Preferably, the interior of the hollow part W being leak tested is subjected first to a low pressure to determine that the part does not leak and then to a high pressure, and measuring any difference in pressure that may occur in the chamber 19 formed between workpiece W and shroud 12 which is normally maintained at, for example, atmospheric pressure. To this end, line 77, see FIGURE 7, from the fixture 11 connects the chamber 19 and measuring instrument 78.

The measuring instrument 78 comprises a housing having a diaphragm 79 therein which divides the housing into separate chambers 80 and 81. Conduit 77 is connected through a branch 77a to the chamber 80 and through branches 77b and 77c to the chamber 81. Branch 77b extends beyond branch 77c to a reference chamber 91. A solenoid controlled valve S-29 is provided in the branch 77b between the branches 77a and 77c to segregate the chamber 80 of the measuring instrument and shroud chamber 19 from the chamber 81 of the measuring instrument and standard chamber 91 while a leak test is being performed. In addition a branch conduit 77d connects the conduits 77 to the atmosphere as controlled by a solenoid controlled valve S-30.

The various fluid valves S-19, S-19A, S-29, S-30, S-31, S-32, S-33, S-34 and S-35 and rams 32 and 71 controlled by valves S-34, S-32 and S-33, respectively, are controlled by individual branches of an electric circuit as shown in FIGURE 7. The branch circuits for operating valves S-32 and S-33 to control operation of the ram 71 for raising and lowering the shroud 12 are shown as comprising a common connection 84 from line L-2 to a branch Br-17 connecting solenoid S-33 to the opposite side of the line L-1 and a branch Br-8 connecting solenoid S-32 to L-1. Branch Br-17 has a silicon controlled rectifier Q-17, hereinafter referred to as an SCR, and one way diode D-17 therein, and the SCR when fired conducts current through the branch to open the valve S-33 to supply motive fluid to close the exhaust from the upper end of ram 71 and operate it downwardly. Rectifier Q-17 is pulsed by a relay 85 connected across a line in series with a resistance 85R and condenser 85c which discharges when the relay is connected to the rectifier. The relay 85, in turn, is actuated by a manually operable switch 86 operating through a relay coil 85d. Branch Br-8 is rendered conductive by a rectifier Q-8 which, when pulsed, energizes solenoid valves S-32 to operate the ram 71 and raise the shroud 12 and, simultaneously, operating through a condenser C-17 between the branches, stops the flow of current through the solenoid of valve S-33.

The common conductor 84 has a branch Br-16 connecting the solenoid valve S-34 across the line and contains a SCR Q-16 which, when fired, renders the branch conductive. Branch Br-6 connects the valve S-30 across the line as controlled by a SCR Q-6; and branch Br-7 connects valve S-29 across the line and is controlled by a SCR Q-7 therein. Branch Br-4 connects valve S-19 for low pressure conduit 62 across the line as controlled by a SCR Q-4 and a selective switch 88; branch Br-4A connects valve S-19A, SCR Q-4A and selective switch 89 for supplying high pressure fluid when 89 is closed; and branch Br-15 connects valve S-31 across the line as controlled by a SCR Q-15 and selective switch 90. Dump valve S-35 is connected in parallel with branches Br-4 and Br-4A by branches Br-4' and Br-4A' to close the dump valve whenever either fill valve S-19 or S-19A is opened.

Actuation of shroud 12 to its lowered position illustrated in FIGURE 7 closes switch 18 which pulses SCR Q-16 in the branch circuit Br-16. Energizing branch Br-16 at the completion of the closing movement of shroud 12 supplies motive fluid to ram 32 to connect the nipple 28 of the fluid supply coupling 26 to the nipple fitting 25 on the part W. When manually operable selective switch 88 is closed, branch Br-4 is completed through switch 87 and contact 87a to energize the solenoid valves S-19 and S-35 for supplying low pressure air, 6 p.s.i. for example, to the interior of the part W. Branch Br-4A is similar to Br-4 and when selective switch 89 is closed a circuit is completed through switch 87 and contact 87b for actuating solenoid valve S-19A to supply high pressure air, 210 p.s.i. for example, to the interior of the part W. Branch Br-4A also includes a coil 87c for actuating switch contact 87 from its normally closed engagement with contact 87a to engagement with contact 87b to open Br-4 and close Br-4A. Energizing either Br-4 or Br-4A picks up the normally open valve S-35 (part dump) thereby maintaining pressure in the part. When the selective switch 90 of Br-15 is closed the solenoid valve S-31 opens to supply a hydraulic fluid to the interior of the fixture 11.

Figure 8:
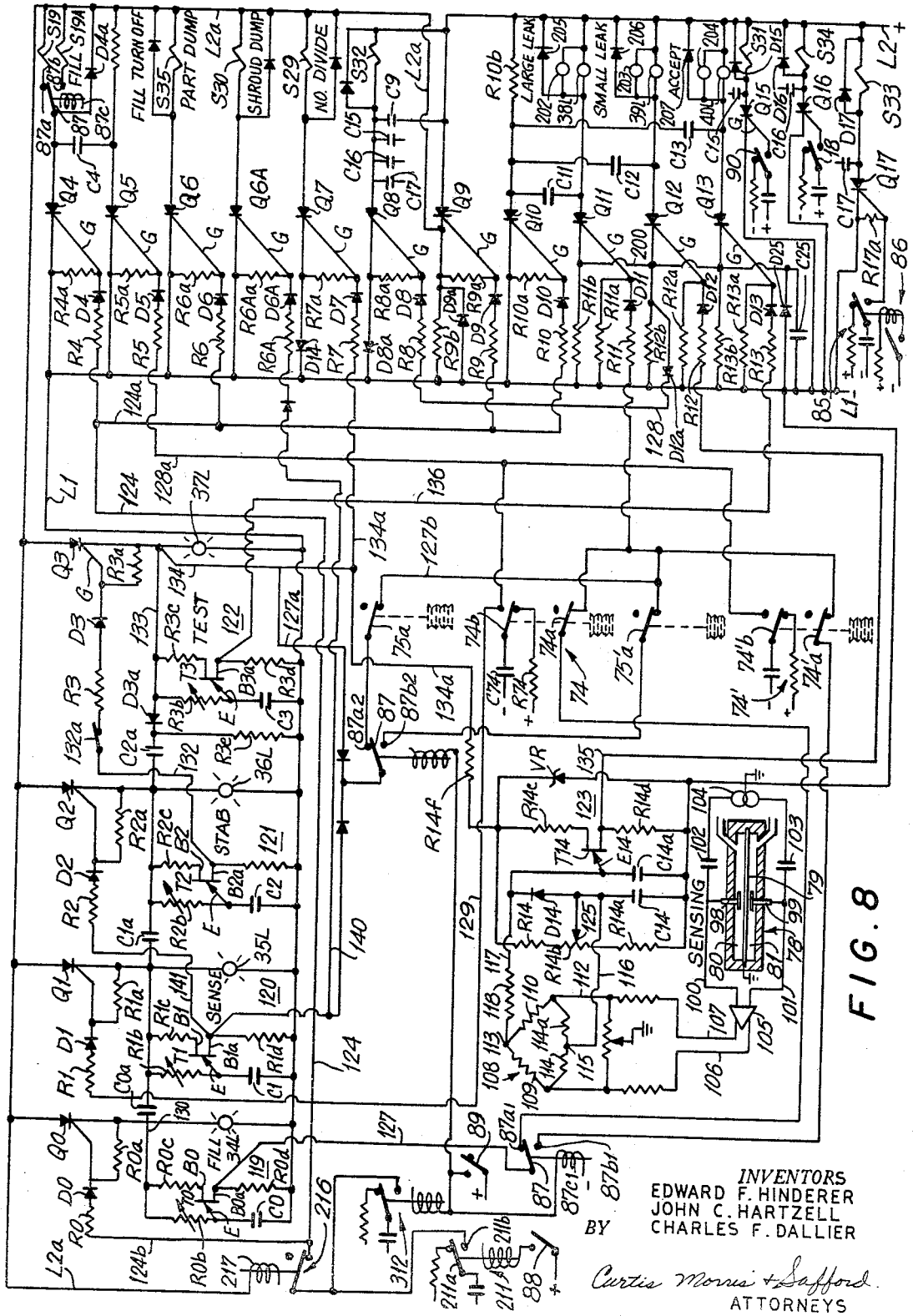
FIGURE 8 is a diagrammatic view of an integrated solid state electronic circuit for controlling the testing steps.

The individual branch circuits for controlling operation of the various elements of the apparatus as illustrated in FIGURE 7 are shown integrated in a complete control circuit in FIGURE 8. The circuit of FIGURE 8 will now be described with the same reference characters applied to corresponding parts in FIGURE 7.

The measuring instrument 78, as stated above, comprises the chambers 80 and 81 at opposite sides of the diaphragm 79. Condenser plates 98 and 99 are mounted on stems in the side walls of the opposed chambers 80 and 81 and are connected by electric lines 100 and 101 to condensers 102 and 103 of the capacitance bridge and the opposite sides of an oscillating generator 104 producing an alternating current. When the diaphragm 79 is centrally positioned between the condenser plates 98 and 99 the capacitance bridge is balanced. However, if the diaphragm 79 moves to the right in FIGURE 7 upon an increase in pressure in shroud chamber 19, due to a leak in the part W to be tested, the plate 99 becomes more highly charged than plate 98. This difference in charge on the condenser plates 98 and 99 unbalances the capacitance bridge and produces a voltage difference between lines 100 and 101 which is directly proportional to the degree of displacement of the diaphragm 79, which, in turn, is directly proportional to the difference in pressure in the chambers 80 and 81. This difference in voltage produces a current flow in lines 100 and 101 which is amplified in amplifier 105 and led through lines 106 and 107 to a resistance bridge 108. Suitable ground connections are provided for the diaphragm 79 and bridge circuits. Thus, the measuring instrument 78 constitutes a transducer which converts mechanical movement to an electric potential. The change in potential, due to deflection of the diaphragm 79, produces a current flow in resistance bridge 108. The bridge 108 has resistances 109 and 110 connected to opposite sides of the output lines 106 and 107 from the capacitance bridge which are connected to each other at the junction 113, and resistances 114 and 114a connected across the line in parallel with 109 and 110 are connected to each other at their juncture 115. Thus, any transient voltage generated by the transducer will be transmitted from the bridge through lines 116 and 117. This difference in voltage is used to automatically indicate a leak in the part being tested.

The electric circuit automatically controls the sequence of the steps of an entire leak testing operation and then indicates the result of the test. The steps of a testing operation are performed in a predetermined timed sequence and all mechanical switches except the manual switches for selecting tests to be made and pressure operated switches 74 and 75 are eliminated to increase the speed with which the testing steps are performed and to increase the reliability of the system. The control elements are all of the solid state type comprising semiconductors which resist the flow of current until energized by an electric pulse or at a particular voltage level, and then "fire" to cause current flow until a pulse is imposed which resists current flow and shuts off the flow of current. The semiconductor current control devices used in the control circuit includes silicon controlled rectifiers SCR, transistors T and diodes D. Such elements are readily controlled and stable for starting and stopping the flow of current in branch circuits and the diodes permit flow of electric current in one direction only and protect the rectifiers and transistors.

The circuit, in general, comprises a plurality of branches connected in parallel between line L–1 and L–2 of a DC source as, for example, 24 volts. Certain of the branch circuits comprise a plurality of timing RC networks 119, 120, 121 and 122 corresponding to the fill, sense, stabilize and test steps, each of which requires a predetermined period of time; current responsive branches for actuating instrumentalities, such as the solenoid operated valves S–19, S–19A, S–29, S–30, S–31, S–32, S–33, S–34 and S–35 required for performing the testing steps; current responsive branches for indicating the various steps of the testing operation; current responsive branches for indicating the result of the test; and the interconnections between the various branches to energize the timing and current responsive branches in the proper timed sequence and for indicating the various steps of the testing.

The timing branches 119, 120, 121 and 122 for controlling the time period for filling, sensing, stabilizing and testing, respectively, are identical so that a description of the one for controlling the filling operation, and indicated by the subscript (0), will suffice for the others. The RC network for the timing branch 0, for example, includes a variable resistor R–0b and capacitor C–0. The variable resistor R–0b is adjustable to vary the time period for filling between, for example, 1 and 5 seconds. The resistor R–0b and capacitor C–0 are connected in series across the 24 volt line and the emitter E of the unijunction transistor T–0 is connected between the resistor and capacitor. Balancing resistors R–0c and R–0d are connected between the bases B–0 and B–0a of the transistor T–0 and opposite sides of the line. The elements of the timing branches 120, 121 and 122 are indicated by the same reference characters as the timing branch 119 with subscripts 1, 2 and 3, respectively. Each of these timing branches takes a predetermined period of time to charge the capacitor to the potential at which transistor conducts current.

A current responsive indicating device such as an electric lamp 34–L, 35–L, 36–L and 37–L is connected in parallel with each timing branch 119, 120, 121 and 122, respectively, for illuminating signs indicating the performance of each of the fill, sense, stabilize and test steps.

All of the other current responsive devices are connected in parallel branches, generally designated 4 to 17, between the lines L–1 and L–2 and these branches include control as well as current responsive devices. For example, the solenoid coils for operating the fill valves S–19 and S–19A, dump valve S–35 for the part, dump valve S–30 for the shroud chamber 19 and divide valve S–29 are connected in branch circuits Nos. 4, 6, 6–A and 7, respectively. Control valves S–32 and S–33 for the ram 71 that operates the shroud 12 are connected in branch circuits Br–8 and Br–17, respectively; control valve S–31 for supplying pressure fluid to the interior of the fixture 11 is connected in branch circuit Br–15; and control valve S–34 for controlling ram 32 that actuates coupling 26 is connected in branch circuit Br–16. Also electric current lamps 38L, 39L and 40L for indicating the result of a test are shown connected in branch circuits 11, 12 and 13. Thus, when any of the lamps 38L, 39L or 40L is energized it will illuminate an indicator to show a large leak, a small leak or an accept condition.

A leak sensing circuit branch 123, responsive to variations in the electrical output from the measuring instrument 78 and bridge circuit 108, is connected between the branch 122 for timing a test period and the current responsive branch 12 including the indicator lamp 39–L for indicating a small leak. The leak sensing circuit comprises a unijunction transistor T–14 having an emitter E–14 connected to the junction 115 from the bridge circuit 108 through a line including a directional diode D–14 between lines 116 and 117 and a tap contact 125. A capacitor C–14 also is connected in said line in series with the diode D–14. One end of the line is connected to output line 117 from the junction 113 of the bridge 108 and includes a resistor 118, and an intermediate point in the line beyond tap contact 125 is connected to the other output line 116 from the bridge. Output line 117 also is connected to a second capacitor C–14a in parallel with capacitor C–14, and between diode D–14 and capacitor C–14a the line is connected to the emitter E–14 of the transistor T–14. Transistor T–14 has a circuit including balancing resistors R–14 and R–14a and a variable resistor R–14b therebetween and the transistor is connected between branch circuit 3 and line L–1. Tap contact 125 engages resistance R–14b, which in effect constitutes a potentiometer, and the tap contact 125 is adjustable to initially adjust the size of the leak which can be detected. Resistors R–14c and R–14d are connected between the bases of the transistor T–14 and output from branch 3 and line L–1 in parallel with resistors R–14 and R–14a. Also in parallel with the resistors and across the line including the transistor T–14 is a voltage regulator VR to maintain a constant voltage difference applied to the opposite bases of the transistor. A resistor R–14f is connected between transistor circuit and the branch circuit 3.

The circuit will now be described by the functions it performs so that in addition to describing the circuit, the mode of operation of the testing apparatus also will be described. When a part W, such as a housing for a disc type brake, see FIGURE 1, is to be tested for leaks, it is placed on the fixture 11 while the shroud 12 is in a raised position. Manual switch 86 is then closed which, acting through the relay 85, pulses the SCR Q–17 which fires to render the branch circuit Br–17 conductive. Energization of branch B–17 operates through condenser C–17, see FIGURE 7, to deenergize branch Br–8 and open valve S–32 for exhausting motive fluid from the opposite side of piston 72. Branch circuit Br–17 opens solenoid valve S–33 to supply motive fluid to the ram 71 which lowers the shroud 12 to the position illustrated in FIGURES 1 and 7. The lower edge 13 of the shroud 12 then engages the pad 14 on the support 10 to seal the joint therebetween. At the end of the lowering movement of the shroud 12, see FIGURE 2, the clamping elements 15 in the shroud engage the part W to clamp it to the support 10 and the shroud closes switch 18. Closing of switch 18 immediately pulses Q–16 in branch Br–16.

Pulsing of Q–16 energizes branch Br–16 to open solenoid valve S–34 and supply motive fluid to ram 32 to actuate the coupling sleeve 26 and engage nipple 28 thereof with the nipple fitting 25 on the part being tested. The apparatus is then ready for a testing operation.

To test the part W to determine if the pistons 33, 33a, 34, 34a therein operate properly, the selective switch 90 will have been manually closed, see FIGURE 7, to pulse Q–15 and complete a circuit from L₂ through branch Br–15 to open solenoid valve S–31 and supply a hydraulic fluid (60 p.s.i.) to the fixture 11 through conduit 76. The pressure of such motive fluid actuates the opposed pistons 38a, 38b and 39a, 39b away from each other in said fixture and, in turn, actuates the pistons 33, 33a and 34, 34a in the brake housing W, see FIGURE 5. Such movement of pistons 38a, 38b and 39a, 39b in the fixture 11 is limited by the engagement with the snap rings 42. In certain installations the application of hydraulic force on the fixture pistons is withdrawn and in some instances a suction is produced as by means of a piston in the hydraulic system to withdraw the fixture pistons after they have moved the pistons 33, 33a and 34, 34a into the part W.

If the pistons 33, 33a, 34 and 34a all were found to move outwardly from the fixture 11 and into the part W as sensed by the balanced electronic circuit 61, see FIGURE 7, the manually operable switch 88 may be actuated to initiate a low pressure leak test. Selective switch 88 is shown in more detail in FIGURE 8 as closing a circuit through a relay coil 211 which operates the movable contact 211a into engagement with contact 211b and produces an electric pulse which is directed through lines 124 and 124a to resistor R-10 and diode D-10 of branch circuit 10 to the gate G of SCR Q-10 therein. Pulsing of Q-10 causes it to fire and produce current flow from line L-2 to L-1 through the branch 10 including resistor R-10b. Branch 10 also includes a resistor R-10a to protect the rectifier from excessive current flow. Current flow through branch 10 charges capacitors C-11, C-12 and C-13 which puts a bias on the SCR rectifiers Q-11, Q-12 and Q-13 in branches 11, 12 and 13 sufficient to shut off any current flow therein. Thus, the lamps 38L, 39L and 40L in the branches 11, 12 and 13 will be extinguished.

Simultaneously, a pulse will be directed from line 124a to gate G of SCR Q-9. When rectifier Q-9 fires, current will flow through branch 9 including resistor R-9b with a diode connected in parallel into the resistance. As branch 9 is connected to line L-2a, one end of all of the branches 1 to 7 will be supplied current from line L-2. Branch 9 also includes reistance R-9a.

Also, the pulse in line 124 will be directed to the gate G of SCR Q-4 in branch 4 having resistors and diodes similar to branch 9, and through line 124a to Q-6. Firing of rectifier Q-4 produces a current flow through the branch 4 and one or the other of the solenoid operated fill valves S-19 or S-19A as connected by the switch contact 87a for opening the valve. Firing of rectifier Q-6 produces a current flow therethrough for operating the part dump valve S-35 to closed position, see FIGURE 7.

Lastly, the actuation of switch 88 directs a pulse through line 124b to the gate G of the SCR Q-0 through resistor R-0 and the isolating diode D-0. Firing of rectifier Q-0 produces a current flow through the electric lamp 34-L to indicate that a filling step is being performed. Branch 0 has a resistor R-0 to protect the rectifier Q-0, the same as branches 4, 6 and 11 to 13. The firing of the rectifier Q-0 also energizes the RC network of timing branch 119.

With the fill valve S-19 and divide valve S-29 open and dump valve S-35 closed, air under pressure (6 p.s.i.) flows through the conduits 62 and 68, see FIGURE 7, to fill the chambers 20b and 21b in the separate sections of the part W being tested. If the part W being tested has a large leak, either through its walls or past pistons 33, 33a, or 34, 34a which prevents an increase in pressure in the conduit 62 within, for example, 5 seconds, transistor T-0 of the first timing device 119 fires and transmits a pulse through the line conductor 127, contact 87a of a selective switch 87 for the low pressure test and contact 74a of the pressure responsive switch 74 and then through the resistor R-11 and diode D-11 to the gate G of an SCR Q-11 in the branch circuit including the electric lamp 38-L. This branch circuit 11, like the others, has resistance R-11a and resistance R-11b. Firing of rectifier Q-11 causes current flow through the electric lamp 38L to light the lamp and indicate a "large leak" in the part being tested. Current in branch 11 also flows through conductors 200 and 128 to gate G of a silicon controlled rectifier Q-8 in branch 8. This branch includes a resistance R-8 and R-8a and is connected through capacitor C-9 to the branch 9 circuit including the rectifier Q-9. Current flow through the branch 8 produces a bias in the branch 9 sufficient to shut off the flow of current through the latter. Such interruption in the current flow from the line L-2 to its extension L-2a opens the branches 1 to 7, including the solenoid windings S-19 and S-35. De-energization of solenoids S-19 and S-35 closes the fill valve and opens dump valve from the part. Energization of branch circuit 8 also operates through condensers C-17 and C-16 to open branches Br-17 and Br-16, de-energize valves S-33 and S-34 and release the pressure fluid at one side of ram 71 and from ram 32 and energize the valve S-32 to supply motive fluid to the other side of ram 71. Thus, sliding coupling 26 is withdrawn from the part W and shroud 12 raised away from the part. In other words, all of the branch circuits are de-energized except branches 8 and 11 which remain energized to hold the shroud raised and indicate a large leak in branch 11.

Furthermore, if the pressure of the testing fluid supplied to the part initially opens contacts 74a of switch 74 but the contact again closes before a test is completed, due to a leak in the part being tested, the branch circuit 11 is energized to indicate a large leak. To this end, the branch circuit 3 is connected by a conductor 127a to the pole of selective switch 87 for a low pressure test to the switch contact 75a of low pressure switch 75 and from this switch to the gate of SCR Q-11 by a conductor 127b. Thus, when Q-3 fires to start a test period and switch 75a is closed, branch circuit 11 is energized to indicate a large leak.

If, after initation of a test, the pressure of the testing fluid increases sufficiently to open the contact 74a of the switch 74 before the transistor T-0 of the timing circuit 119 times out and fires, the branch circuit 11 will not become energized, which indicates that no large leak exists in the part W being tested. Contact 74b of the pressure switch 74 is normally connected across lines L-1 and L-2 through the resistance R-74 on one side and capacitor C-74 on the other side and, when actuated by the increase in pressure to engage its other contact, it transmits an electric pulse from the capacitor through the line 129 to gate G of the SCR Q-1 in branch 1 to cause it to fire and light the lamp 35-L indicating a step to determine whether a large leak exists before closing the dump valve S-30 from space 19 in shroud 12. Current flow in branch 1 acts through a line 130 between branches 0 and 1 having a capacitor C-0a which produces a bias on branch 0 and shuts off current flow therein and extinguishes lamp 34-L. Firing of the rectifier Q-1 also energizes the RC network of timing circuit 120.

When branch circuit 9 became energized to supply current from L-2 to L-2a, it energized coil 217 of a relay 216 to open the line to conductor 124 to prevent any false starts before the test is completed.

Simultaneously, contact 74b of the pressure switch 74 delivers an electric pulse through the line 128a to gate G of the SCR Q-5 to produce a flow of current to branch circuit 5. Branch circuit 5 is connected to the branch circuit 4 through capacitors C-4 which produces a bias on the rectifiers Q-4 to shut off current flow in this branch. The interruption of current flow in branches 4 de-energizes the solenoid operated fill valve S-19 or S-19A which closes.

A predetermined period of time after dump valve S-35 has closed and the fluid pressure in the part W has remained showing that there is no large leak in the part, the RC network in the sensing branch will produce a voltage on the emitter E of transistor T-1 sufficient to cause it to fire. Firing of transistor T-1 will transmit a pulse through a line 140 to the gate G of SCR Q-6A which fires and closes the dump valve S-30 for the space 19 between the workpiece W and shroud 12. This insures that the space 19 will be at atmospheric pressure. Simultaneously, firing of transistor T-1 will transmit a pulse through line 141 to the SCR Q-2 of the stabilizing branch 121 to initiate its timing cycle and operate through C-1a to turn off lamp 35-L.

A predetermined time period after the shroud dump valve S-30 has closed and the fluid pressure has become stabilized throughout the system, the RC network of the stabilizing branch 121 will initiate a voltage on the emitter E of the transistor T-2 which will cause it to fire. Firing of the transistor T-2 produces a current flow through the line conductor 132 and test switch 132a therein to the gate G of the SCR Q-3 in branch 3 to cause it to fire and conduct current through the lamp 37-L indicating that a testing step has been initiated. Firing of the rectifier Q-3 sends a pulse through the line 133 to the condenser C-2a to put a bias on the rectifier Q-2 and stop current flow through the lamp 36-L. Firing of rectifier Q-3 also energizes the RC network of the timing circuit 122. Firing of the rectifier Q-3 also delivers a pulse through line 134 to the gate G of rectifier Q-7 causing it to fire and conduct current through branch 7 including the normally-open divide valve S-29, see FIGURE 7. Closing of divide valve S-29 then segregates the ballast tank 91 and chamber 81 of the measuring instrument 78 from the remainder of the fluid testing system so that the opposite chamber 80 of the measuring instrument is connected to the chamber 19 between the part W and shroud 12. Firing of the rectifier Q-3 also directs current through the branch line 134a and resistance R-14f to energize the sensing circuit including the transistor T-14.

The chamber 19 in the shroud 12 and chambers 80 and 81 in the measuring instrument 78 are initially at atmospheric pressure so that an extremely sensitive diaphragm 79 may be used and any leakage in the part will increase the pressure in the shroud chamber 19. Any deflection of the diaphragm 79 of the measuring instrument 78 resulting from a small leak in the part being tested produces a difference in voltage between the lines 116 and 117 which is impressed on the emitter E-14 of the transistor T-14. When this potential rises to a predetermined value for which it is set, the transistor T-14 fires and produces a current flow through the line 135 to the gate G of the SCR Q-12 to cause it to fire. Firing of the rectifier Q-12 produces a current flow through the branch 12 including the lamp 39-L to indicate that a small leak exists. Branch circuit 12 has a resistance R-12b between the rectifier and side L-1 of the line and a line is connected through a diode D-12a to the conductor 128. A pulse is then transmitted through line 128 to gate G of rectifier Q-8 in branch 8 and acting through the capacitor C-16 to de-energize valve S-34 and capacitor C-17 to de-energize valve S-33 which withdraws sliding coupling 26 and reverses the operation of ram 71 to raise shroud 12 in the same way as previously explained. Energization of branch Br-8 also acts through capacitor C-9 to shut off current flow through branch 9 and thereby disconnects the extension L-2a from L-2 and returns all of the circuits 1 to 7 and instrumentalities actuated thereby to their initial position including the valves S-19 or S-19A, S-29, S-30 and S-35 and acting through condensers C-16 and C-17 de-energizes circuits 16 and 17 to actuate valves S-34 and S-33 to an exhaust position.

If no leak exists in the part being tested, no current is produced in the sensing circuit, so that no voltage is transmitted to the emitter of the transistor T-14 in the testing circuit sufficient to cause it to fire. When the transistor T-3 in the RC timing circuit 122 fires, a pulse is transmitted through the line conductor 136 to the gate G of the rectifier Q-13 in the branch circuit 13. Rectifier Q-13 then fires conducting current through the lamp 40-L indicating no leak in the part W being tested. Branch circuit 13 includes resistances R-13a and R-13b between the SCR Q-13 and opposite side of the line L-1. The cathode of Q-13 is connected between the resistance R-13b and the gate G to line 200 which, in turn, is connected to line 128 for firing the rectifier Q-8 in branch 8 to interrupt current flow from the line L-2 to extension L-2a, as previously described, to terminate the testing operation. All of the circuit branches 1 to 7, 14, 15, 16 and 17 are then de-energized and the elements controlled thereby are returned to their initial position. Upon de-energization of the branches 6 and 7, the dump valve S-35 and divide valve S-29 open to reduce the pressure in the fluid system to zero at which time the pressure switches 74 and 75 are returned to their initial position, illustrated in FIGURE 8. The only branch circuits which remain energized are the one indicating that the part has no leak and branch 8 including valve S-32 to hold the shroud 12 in raised position.

After a low pressure test has been completed and no leak is found to exist, a high pressure test may be made by closing selector switch 89 in a branch circuit Br-4A in parallel with Br-4. Closing the start switch 86 operates through the relay 85 to pulse and fire SCRQ-17 in branch Br-17. When Q-17 fires it produces current flow through branch Br-17 which acting through condenser C-17 de-energizes valve S-32 and energizes valve S-33 to lower the shroud 12. Selector switch 89 is then closed which acts through the relays 312 and delivers a pulse to lines 124, 124a to fire SCRQ-10, SCRQ-9, SCRQ-6, SCRQ-4 and through line 124b to fire SCRQ-0 to initiate a testing operation at high pressure. The testing operation then proceeds in the same way as previously described except that high pressure testing fluid (210 p.s.i.) is delivered from a source through a conduit 65 and valve S-19A to the chambers at the interior of part W being tested; and the pressure switches 74' and 75' are connected in alternate with switches 74 and 75 through high pressure contact of selective switch 87 to control the circuits. In addition to testing for leaks, the high pressure fluid at the interior of the part actuates the pistons 33, 33a and 34, 34a outwardly from the brake housing W until they engage the sides of fixture 11 and pushes the pistons 38a, 38b, and 39a and 39b inwardly toward each other, relative to the sensing elements 48a, 48b, 49a and 49b.

In addition to testing for leaks, the system of the present invention measures movement of the pistons 33, 33a and 34, 34a. Any movement of the pistons 33, 33a, 34 and 34a will be sensed by the electronic control circuit 61. Such movement includes movement into the chambers 20b and 21b, see FIGURE 5, or their movement back to a position against the sides of the fixture 11 during a high pressure test, or their slight movement back into the chambers after fluid pressure is released on opposite sides. This latter movement of a few thousandths of an inch simulates the movement of the piston in actual use as a disc brake and results from tension in the sealing rings 35, ususally quad rings, which spring back and release the engagement of the end of the piston with the brake disc. Movement of the pistons 33, 33a, 34 and 34a, either large or small relative to the sensing elements 48a, 48b, 49a and 49b varies the inductance in one side of the balanced electronic circuit 61, see FIGURE 7, and produces a movement of the balanced indicator, or meter 61d, to show that the pistons have moved. If any one of the pistons fails to move, a difference reading will be produced on the meter 61d. Selective switching, not shown, may be manipulated or automatically actuated to test each sensing element 48a, 48b, 49a and 49b separately to determine which piston 33, 33a, 34 or 34a has failed to move. This test for movement of the piston can be made in any suitable sequence with respect to the leak tests, and the sequence of the various tests may be automated if desired by the control circuit and thereby eliminate the manual switches 86, 88, 89 and 90. At the completion of a leak test at high pressure and movement test of the pistons, the shroud 12 and coupling sleeve 26 are returned to their original positions and the branch circuits are also returned to their original condition in the manner previously explained with respect to the low pressure test. The part W is then removed from the fixture 11 and placed with an accept or reject group depending upon the result of the tests. Another part W is then placed on the fixture and the test procedure repeated.

In some instances it has been found desirable to produce a slight partial vacuum in the shroud 12 as it is being lowered to compensate for any increase in pressure in the chamber 19 resulting from vertical movement of the shroud relative to the support 10 after its peripheral edge 13 engages the yielding pad 14 and seals the joint therebetween. To this end, the exhauster P, see FIGURE 1, may be connected to start and stop with the lowering movement of the shroud 12. Usually however, the late closing of the shroud dump valve S-30 will maintain atmospheric pressure in shroud chamber 19 which is sufficiently low for rapid stabilizing and accurate testing for leaks. In other applications, it may be desirable to evacuate the shroud chamber 19 and housing of the measuring instrument 78 connected thereto to a low vacuum to compensate for temperature variations. For example, if hot castings are being tested the vacuum reduces the tendency toward false readings, due to a temperature difference, and also provides a more positive response to any changes in pressure.

Figure 9:
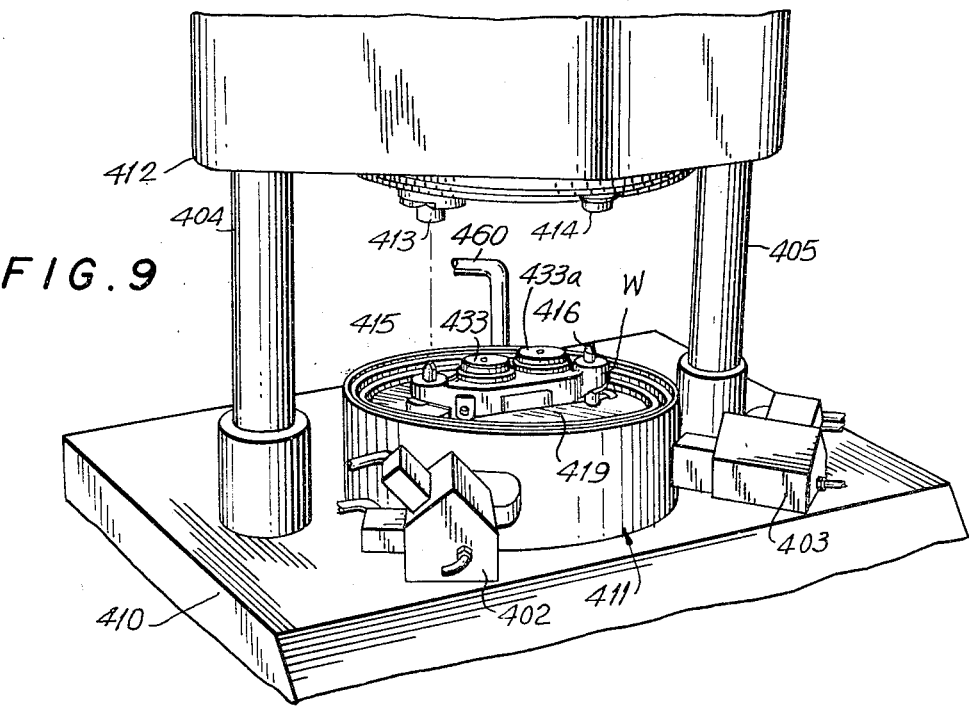
FIGURE 9 is a view of an apparatus for sensing movement of parts in a brake housing of modified construction.
Figure 10:
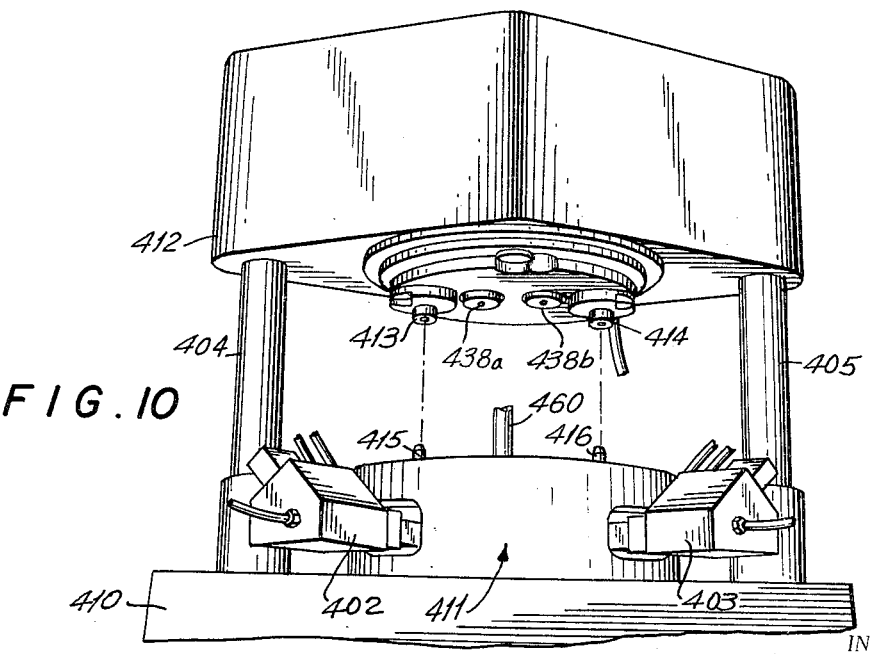
FIGURE 10 is a view similar to FIGURE 9 and showing how the fixture and shroud cooperate.

FIGURES 9 and 10 disclose a testing apparatus of modified construction for testing disc type brake-housings W having separate left and right hand parts each containing pistons 433 and 433a. The separate sections are tested in the same apparatus but have ports at different locations.

For purposes of description, only one section W is illustrated. The fixture 411 for mounting a brake-housing W is illustrated. The fixture 411 for mounting a brake-housing W is of generally cylindrical shape and recessed at its upper end. Pins 415 and 416 on the fixture extend upwardly through holes in the ends of the brake section W to properly position it on the fixture. A closure 412, corresponding to shroud 12 in FIGURE 1, is mounted on hydraulic piston rods 404 and 405 for movement toward and away from the fixture 411 to enclose the brake-housing W therebetween and provide a space 419 between the part and shroud. Bosses 413 and 414 on the shroud cover 412 cooperate with the pins 415 and 416 to clamp the part W on the fixture and in the preferred embodiment illustrated, the pins 415 and 416 and their support are depressed by the bosses 413 and 414 to clamp the part against a nipple for feeding a testing fluid to the interior thereof. Pistons 438a and 438b, corresponding to pistons 38a and 38b in FIGURE 1, are mounted in the closure 412 to overlie the pistons 433 and 433a in the part W. Fittings 402 and 403 connect fluid lines to the interior of the part W for supplying a testing medium to either a left or right hand section. A line 460 connects the space 419 enclosed by the shroud to a measuring instrument the same as in the apparatus illustrated in FIGURES 1 to 8.

In the modified construction, however, the sensing elements (not shown) are located in the shroud cover 412 adjacent the pistons 438a and 438b and the movement of these pistons in the shroud cover is measured instead of the movement of the pistons 433 and 433a directly. Such movement of pistons 438a and 438b, of course, corresponds to movement of the pistons 433 and 433a. Such an arrangement avoids sensing different metal alloys or crystallized structures observable in a very sensitive electronic sensing circuit.

The apparatus shown in FIGURES 9 and 10 operates in substantially the same way for testing movable parts in an assembly as well as leak testing at high and low pressures.

It will now be observed that the present invention provides a testing apparatus which is adapted to measure very small changes in pressure when using a high pressure testing medium without danger of damaging the sensing element. It will also be observed that the present invention provides a testing apparatus which will test movable parts of an assembly as well as for leaks. It will still further be observed that the present invention provides a testing apparatus for testing parts for leaks at both low and high pressures. It will still further be observed that the present invention provides a leak testing apparatus of relatively simple and compact construction which may be economically manufactured and one which is reliable in operation.

While two forms of construction are herein illustrated and described, it will be understood that further changes will be made in the construction and arrangement of parts without departing from the spirit or scope of the invention.

We claim:

1. Apparatus for testing parts having at least one movable element to determine whether the part leaks and the movable element operates properly comprising a support, a fixture on said support for mounting parts to be tested, a shroud movable into sealing engagement with the support to enclose the part and fixture and form chambers at opposite sides of a wall of the part, a movable member on one of the fixture and shroud components in alinement with the movable element in said part, means for supplying a motive fluid to actuate the movable member and movable element in said part, means adjacent the movable member and element for indicating any movement of the latter, means for producing a difference in pressure in the chambers at the opposite sides of the wall of the part being tested, and means for measuring any change in pressure in one of the chambers resulting from a leak.

2. Apparatus in accordance with claim 1 in which the support has a yielding surface engaged by the lower edge of the shroud, a fluid motor for raising and lowering the shroud, means on the shroud for engaging the part to be tested to clamp it on the support, and means to limit the movement of the shroud toward the support.

3. Apparatus in accordance with claim 1 in which the movable element in the part being tested is a piston, the movable member in alinement with the movable element is a piston in the fixture, and the means for supplying a motive fluid is connected to the interior of the fixture to actuate the piston therein and thereby actuate the movable piston in said part.

4. Apparatus for testing parts in accordance with claim 1 in which the part being tested is a hollow disc type brake-housing, and the means for indicating movement of the element is a sensing coil in an electronic circuit and located in said fixture adjacent the movable element in said part and responsive to movement thereof.

5. Apparatus for testing parts in accordance with claim 1 in which the means for producing a difference in pressure in the chambers at opposite sides of a wall of the part comprising means for supplying a testing fluid under pressure to the chamber at the interior of the wall, and said means for measuring any change in pressure being connected to the chamber between the wall and the shroud.

6. Apparatus in accordance with claim 5 in which the support has a conduit therein for connecting the space between the part and the interior of the shroud to the means for measuring any change in pressure.

7. Apparatus for testing parts in accordance with claim 6 in which exhausting means is connected to the space between the part and shroud for evacuating the space.

8. Apparatus in accordance with claim 1 in which the part being tested is hollow and has a nipple fitting, a slidable fluid connection mounted on the shroud and having a nipple for engaging the fitting on the part, and means for moving the sliding connection to connect the interior of the hollow part to the exterior of the shroud.

9. Apparatus for testing parts in accordance with claim 8 in which the means for supplying fluid under pressure comprises separate sources of fluid at different pressures, and means for selectively connecting the separate sources of fluid to the interior of the hollow part being tested.

10. Apparatus for testing parts in accordance with claim 1 in which the movable member is in the fixture, valves for controlling the flow of motive fluid to the fixture and testing fluid to one of the chambers, and an electronic control circuit for actuating the valves to supply motive fluid to actuate the movable element in opposite directions and produce a difference in pressure in the chambers at the opposite sides of the wall in the part being tested.

11. Apparatus for testing parts in accordance with claim 10 in which the part being tested is a hollow disc type brake-housing, and a conduit controlled by said valve means for supplying a testing fluid to the interior of the hollow housing for actuating the movable element therein and producing a difference in pressure in the chambers formed by the interior of the hollow housing and the space between the exterior of the housing and the shroud.

12. Apparatus in accordance with claim 1 in which the movable element in the part being tested is a piston, the movable member in alinement with the movable element is a piston in the movable shroud, and the means for measuring any movement of the movable element is a sensing coil in an electronic circuit and located in the shroud adjacent the piston in the shroud.

13. Apparatus for testing the hollow housing of a disc type brake having at least one piston movable into and out of the housing, comprising a support, a fixture on said support for mounting the hollow brake housing to be tested, a shroud movable into seating engagement with the support to enclose the part and fixture to form a closed chamber at the exterior of said housing, said shroud having a nipple for engaging the fitting on said part, a piston in said fixture in alinement with the piston on said part, means for supplying a motive fluid to said fixture to move said piston of said part into said housing, means for supplying a testing fluid under pressure to the interior of said housing to move said piston out of said housing and toward said fixture, an electronic circuit having a sensing coil adjacent said piston in said fixture and a responsive element for indicating movement of said piston, and means for measuring any change in pressure in one of said chambers resulting from a leak.

14. Apparatus for testing hollow parts for leaks comprising a support, a fixture on said support for mounting a part to be tested, said hollow part forming an interior chamber and having a nipple fitting, a shroud movable into sealing engagement with the support to enclose the part and fixture and form a chamber externally of the part, said support having a seat of yielding material engaging the lower edge of the shroud, a fluid connection on said shroud having a nipple for engaging the fitting on a part, means for supplying a testing fluid through said connection to the chamber at the interior of said part, a conduit in the fixture connecting the space between the part and shroud to the exterior of the shroud, means for evacuating air from the shroud to create a partial vacuum therein after the edge becomes seated to reduce the effect of a temperature difference, and means for measuring any change in pressure in one of the chambers resulting from a leak.

15. Apparatus for leak testing the housing of a disc type brake having spaced-apart hollow sections and a pair of pistons in each hollow section, a fixture on said support for mounting the brake housing and having opposite pairs of pistons in alinement with the pistons in the brake housing, a shroud movable into sealing engagement with the support to enclose the part and fixture to form a closed chamber at the exterior of said housing, means for supplying fluid under pressure through said shroud to the hollow section of said housing, said last named means comprising separate sources of testing fluid at low pressure and high pressure and means for connecting said sources to said hollow sections, means for supplying a fluid under pressure to the interior of said fixture for moving the pistons therein outwardly and moving the pistons in said part inwardly into the housing, an electric circuit having sensing coils adjacent said pistons in said housing, responsive elements for indicating movement of said pistons, and means for measuring any change in pressure in one of said chambers resulting from a leak.

References Cited

UNITED STATES PATENTS

| | | | |
|---|---|---|---|
| 1,649,287 | 11/1927 | Butler | 73—49.2 |
| 2,806,371 | 9/1957 | Stecker | 73—49.2 |
| 2,833,141 | 5/1958 | Holm | 73—40 |
| 2,880,610 | 4/1959 | McCoy | 73—49.2 |
| 3,186,214 | 6/1965 | Roberts | 73—40 X |
| 3,326,034 | 6/1967 | Fitzpatrick et al. | 73—40 |

S. CLEMENT SWISHER, Primary Examiner